US012763046B2

(12) United States Patent
Recchia et al.

(10) Patent No.: US 12,763,046 B2
(45) Date of Patent: Oct. 13, 2026

(54) ELECTRONIC HI-HAT CYMBAL CONTROLLER SYSTEM WITH LINEAR HALL SENSOR

(71) Applicant: InMusic Brands, Inc., Cumberland, RI (US)

(72) Inventors: Daniel Recchia, East Providence, RI (US); John E. O'Donnell, Cumberland, RI (US); John Alex Souppa, Ashland, MA (US); Philip Rick Jeffs, Cumberland, RI (US)

(73) Assignee: InMusic Brands, Inc., Cumberland, RI (US)

( * ) Notice: Subject to any disclaimer, the term of this patent is extended or adjusted under 35 U.S.C. 154(b) by 181 days.

(21) Appl. No.: 18/496,745

(22) Filed: Oct. 27, 2023

(65) Prior Publication Data

US 2024/0144898 A1 May 2, 2024

Related U.S. Application Data

(60) Provisional application No. 63/420,442, filed on Oct. 28, 2022, provisional application No. 63/488,048, filed on Mar. 2, 2023.

(51) Int. Cl.
*G10D 13/065* (2020.01)
*G10D 13/10* (2020.01)
*G10H 1/34* (2006.01)

(52) U.S. Cl.
CPC ........... *G10D 13/065* (2013.01); *G10D 13/26* (2020.02); *G10H 1/34* (2013.01)

(58) Field of Classification Search
CPC ........ G10D 13/065; G10D 13/26; G10H 1/34; G10H 1/0066; G10H 1/46; G10H 2220/521; G10H 2230/321; G10H 2230/331; G10H 3/146
See application file for complete search history.

(56) References Cited

U.S. PATENT DOCUMENTS

| | | | | |
|---|---|---|---|---|
| 8,410,348 B1 * | 4/2013 | Hsieh | G10H 1/32 | 84/743 |
| 8,785,758 B2 * | 7/2014 | Wissmuller | G10H 3/146 | 84/615 |
| 9,053,693 B1 * | 6/2015 | Wei | G10H 3/00 | |
| 10,937,399 B2 * | 3/2021 | Shemesh | G10D 13/26 | |
| 12,254,856 B1 * | 3/2025 | Simmons | G10H 1/348 | |
| 2005/0257672 A1 * | 11/2005 | Arimoto | G10H 7/008 | 84/738 |
| 2012/0048099 A1 * | 3/2012 | Wissmuller | G10H 1/348 | 84/723 |

(Continued)

*Primary Examiner* — Jeffrey Donels
(74) *Attorney, Agent, or Firm* — ARENTFOX SCHIFF LLP

(57) ABSTRACT

A hi-hat cymbal controller for use with an electronic moveable hi-hat cymbal and clutch, both couplable to the pull rod of a traditional hi-hat stand, contains an internally movable electromagnetic field source and sensor responsive to electromagnetic field changes. Downward motion of the hi hat cymbal and/or clutch relative to the stationary controller causes the field source to move axially relative to the sensor which generates a signal data useful by a drum module to initiate and terminate playback of audio samples characteristic of the co-action between the top and bottom cymbals of an acoustic hi-hat system.

16 Claims, 17 Drawing Sheets

(56) References Cited

U.S. PATENT DOCUMENTS

| | | | | |
|---|---|---|---|---|
| 2013/0047826 | A1* | 2/2013 | Wissmuller | G10H 3/146 84/723 |
| 2020/0312285 | A1* | 10/2020 | Shemesh | G10D 13/065 |
| 2021/0287647 | A1* | 9/2021 | Suitor | G10H 3/146 |
| 2024/0144898 | A1* | 5/2024 | Recchia | G10H 1/34 |
| 2024/0144903 | A1* | 5/2024 | Recchia | G10D 13/06 |

* cited by examiner 30
32

60

ELECTRONIC HI-HAT CYMBAL CONTROLLER SYSTEM WITH LINEAR HALL SENSOR

CROSS-REFERENCE TO RELATED APPLICATIONS

This application claims the benefit of U.S. Provisional Application No. 63/420,442, filed Oct. 28, 2022 and U.S. Provisional Application No. 63/488,048, filed Mar. 2, 2023, which is herein incorporated by reference.

FIELD OF TECHNOLOGY

The disclosure relates to the electronic percussion equipment and, more specifically, to an electronic hi-hat cymbal system.

BACKGROUND

The hi hat cymbal is a stable in the repertoire of contemporary percussion instruments and is utilized by drummers and percussionists in a wide variety of musical idioms. Besides creating many different open/semi/closed sounds, a drummer can also use the closing and opening of the hi-hat as its own musical event. Not only does closing the hi hat pedal create this "chick" sound, but it allows the drummer to mute the open ringing hi-hat sounds in musical ways.

A traditional acoustic hi-hat cymbal system typically comprises a cylindrical base tube supported by either a bipod or tripod stand to which a foot pedal is pivotally mounted. The motion of the foot pedal causes a cymbal pull rod coaxially disposed within the base tube to move up and down. A traditional acoustic hi-hat cymbal comprises a lower cymbal which rests at the top of the base tube and an upper cymbal which is fixed relative to the cymbal pull rod. Accordingly, the drummer uses force on the pedal to control the relative position and rate of movement of the upper cymbal relative to the lower cymbal to create percussive sounds.

Electronic hi-hat instruments are currently generally function to trigger playback of sampled acoustic hi hat samples. However, such electronic creations fall short of providing the drummer with the physical responsiveness and feel of progressive pressure/force found in a traditional acoustic hi-hat system setup.

For an electronic hi-hat cymbal to accurately reproduce the sound of a real instrument, it is important to know the velocity and position of a moving cymbal relative to a stationary cymbal. A hi-hat is typically controlled by a foot pedal, with the cymbals apart when a pedal is up, and cymbals together (touching) when a pedal is pressed down. It is important to accurately determine the relative position and velocity of the two cymbals because velocity and distance between the two has a significant effect on how they sound. Most of the effect that velocity and position have on sound occurs when the cymbals are touching and for the first 8 mm or so of separation.

Accordingly, a need exists for an electronic hi hat system which can recreate the feel of the travel distance and progressive pressure/force found in a mechanical acoustic hi-hat setup.

A further need exists for a movable electronic hi hat system that can be used with an existing acoustic hi-hat pedal and pull rod system.

A further need exists for a movable electronic hi hat system with high resolution measurement of the pedal position, and precise control over the linearity of the hi-hat pedal travel.

SUMMARY

Disclosed is a hi-hat cymbal controller for use with an electronic moveable hi-hat cymbal and clutch, both couplable to the pull rod of a traditional hi-hat stand, contains an internally movable electromagnetic field source and sensor responsive to electromagnetic field changes. Downward motion of the hi hat cymbal and/or clutch relative to the stationary controller causes the field source to move axially relative to the sensor which generates a linear signal data useful by a drum module to initiate and terminate playback of audio samples characteristic of the co-action between the top and bottom cymbals of an acoustic hi-hat system.

According to one aspect of the disclosure, an electronic hi-hat cymbal controller apparatus for use with a cymbal pull rod and a cymbal clutch securable to the pull rod, the apparatus comprising: A) a controller housing defining an aperture extending through the controller housing for accommodating a pull rod, B) an electromagnetic field source disposed within the controller housing and movable along an axis of motion by contact with the cymbal clutch; C) a sensor responsive to a position of the electromagnetic field source over a length portion of the axis of motion for generating a signal at least partially corresponding to the position of the electromagnetic field source. In embodiments, the electromagnetic field source is a permanent magnet and the sensor is Hall Effect sensor and wherein the sensor is uniformly responsive to positions of the electromagnetic field source over the length portion of the axis of motion. In embodiments, a characteristic of the signal generated by the sensor is used by a device to determine when to trigger or terminate playback of an audio sample.

According to another aspect of the disclosure, an electronic hi-hat cymbal controller apparatus for use with a cymbal pull rod movable along an axis of motion and a cymbal clutch securable to the pull rod, the apparatus comprising: A) a controller housing defining a central interior; B) a carriage member movable mounted along an axis of motion within the central interior of the controller housing and defining an aperture for accommodating a pull rod, C) a compressible member disposed within the controller housing and adjacent the carriage (e.g., proximate the carriage member); D) a sensor disposed within the controller housing configured for generating a signal associated with an amount of compression of the compressible member. In embodiments, the axis of motion of the carriage member within the central interior of the controller housing is parallel to the axis of motion of the pull rod. In embodiments, the carriage member has an electromagnetic field source disposed thereon and the sensor is responsive to variations in the electromagnetic field caused by movement of the electromagnetic field source. In embodiments, the compressible member comprises a ring of resilient material.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Figure 1:
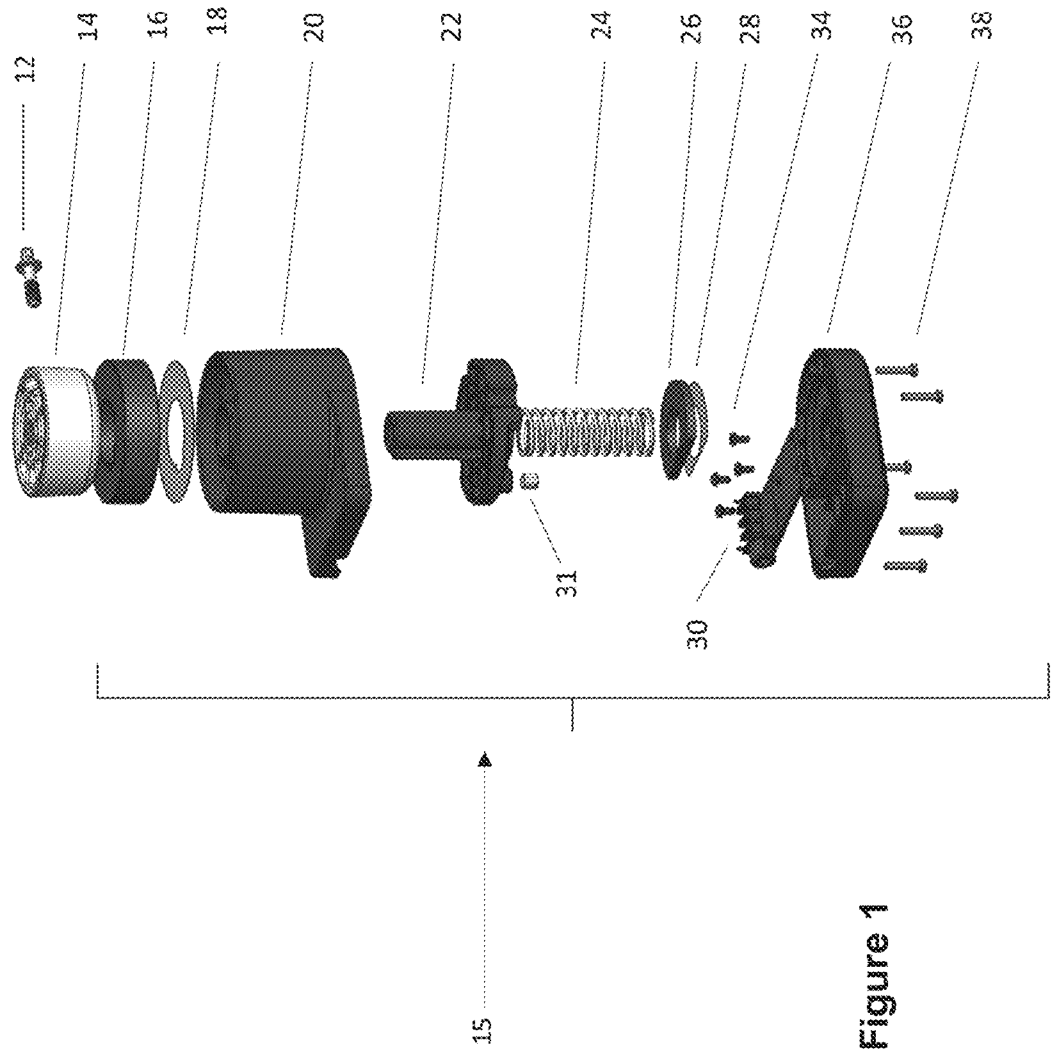
FIG. 1 is an exploded perspective view of a hi-hat symbol controller in accordance with the disclosure.

The present disclosure will be more completely understood through the following description, which should be read in conjunction with the drawings. In this description, like numbers refer to similar elements within various embodiments of the present disclosure. The skilled artisan will readily appreciate that the methods, apparatus and systems described herein are merely exemplary and that variations can be made without departing from the spirit and scope of the disclosure. The terms comprise, include, and/or plural forms of each are open ended and include the listed parts and can include additional parts that are not listed. The term and/or is open ended and includes one or more of the listed parts and combinations of the listed parts.

FIGS. 1-6 illustrate embodiments of a moveable hi-hat cymbal system 10 comprising a controller 15 and clutch 14 for use with an electronic moveable hi-hat cymbal 44, as further described herein. Referring to FIG. 2A, the disclosed electronic moveable hi-hat system 10 comprises a controller 15 and a clutch 14 securable to a pull rod 40 of a traditional hi-hat pedal stand (not shown), for use with an hi-hat electronic cymbal 44. FIGS. 2B-D are side, cross-sectional views of the electronic hi-hat cymbal system 10 of FIG. 2A illustrating the electronic hi-hat cymbal and clutch 14 in closed, open and over-open positions, respectively, relative to the controller 15.

A hi-hat upper clutch 42 and clutch 14 are secured to pull rod 40 and disposed above and below cymbal 44, respectively, to maintain the hi-hat electronic cymbal 44 in a fixed position relative to pull rod 40 as the cymbal 44 moves up and down when the hi-hat pedal is moved. Hi-hat clutch 42 may be part of a third party traditional hi-hat pedal stand or may be of a proprietary design having complementary features for use with the hi-hat electronic cymbal 44.

Clutch 14 may have a generally cylindrical design with a central aperture extending therethrough and substantially flat lower surface to ensure proper surface contact with a compression ring 16 of controller 15, as explained in greater detail with reference to FIG. 1 herein. Clutch 14 may be made from which a rigid materials such as a Acrylonitrile Butadiene Styrene (ABS) thermoplastic polymer. Lower clutch 14 is securable to pull rod 40 by a drum key bolt 12 or equivalent adjustable mechanism.

Electronic hi-hat cymbal 44 comprises a cymbal shaped component having a bow, bell, edge, etc., similar to an acoustic cymbal, that the drummer strikes to trigger the hi-hat cymbal samples playable by an accompanying drum module to which the system 10 is electronically coupled. In embodiments, cymbal 44 may comprise a hollow or semi-hollow disc formed or substantially rigid material at least partially covered with synthetic rubber on a surface area thereof. Within or beneath the surface of electronic cymbal 44 an integrated piezo sensor and additional membrane/switch type sensors that allow the module to identify the location (bow, bell, edge, etc.) on the cymbal 44 where the drummer is striking the cymbal and triggering audio playback of a sound/sample designed to re-create actual hi-hat cymbals.

Figure 3:
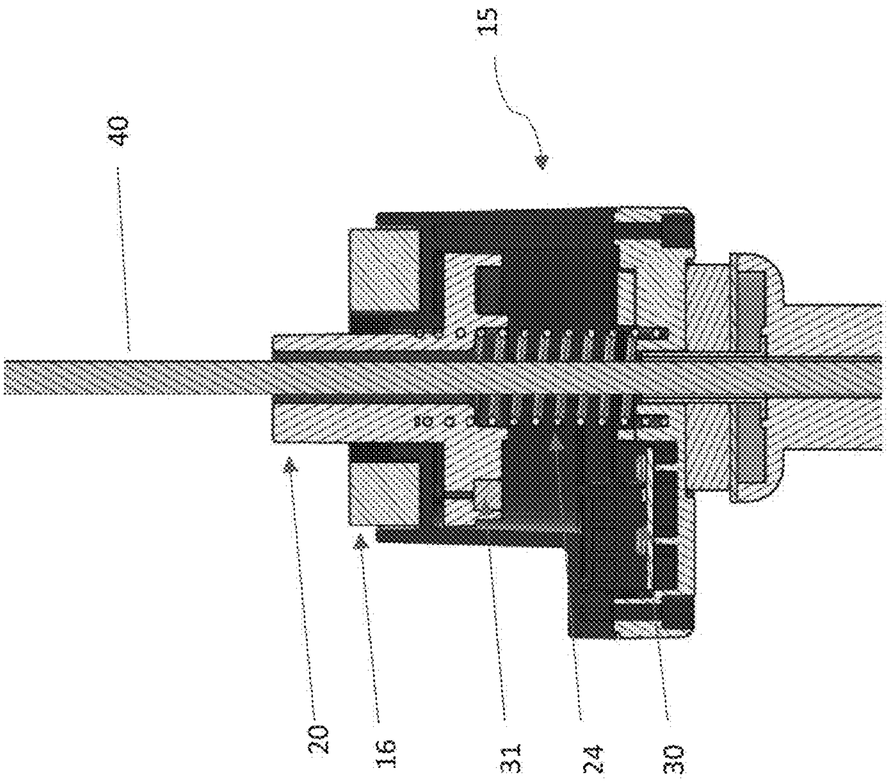
FIG. 3 illustrates is a side cross-sectional view of the controller of FIG. 1 in accordance with the disclosure.

A controller 15 measures the physical position of the electronic hi-hat cymbal 44 as it is pulled downward against the controller 115, in order to simulate the position of the virtual hi-hat and trigger the corresponding audio sample playback. Referring to FIGS. 1 and 3, controller 15 comprises a upper housing member 20 and lower housing member 36 joinable together with complementary mating features to provide enclosure for other elements within controller 15, as explained herein. In embodiments, such housing defines a generally cylindrical portion having an asymmetric flanged projection extending from a side thereof. The generally cylindrical portion accommodates decompression carriage 22 while the flanged projection accommodates sensor 30, both described in greater detail herein.

Upper housing member 20 and lower housing member 36 may be formed of the same or different material including, but not limited to a rigid materials such as ABS thermoplastic polymer. A bottom surface of lower housing member 36 may be substantially flat and may include a shallow cylindrical indentation to accommodate the features of the base tube of a traditional hi hat tripod stand or padding of a traditional acoustic hi-hat cymbal clutch. Lower housing member 36 may have at least a primary aperture extending therethrough to accommodate pull rod 40, as well as other full or partially extending apertures to receive screws 38 or other attachment mechanisms, as illustrated in FIG. 1. A top surface of lower housing member 36 defines shallow cylindrical indentation to accommodate an O-shaped stop plate 26 which may be implemented with any natural or synthetic compressible materials including synthetic rubber compression. The stop plate 26 is seated within the upper surface of lower housing member 36 and retained therein through either frictional engagement or with adhesive member 28 which may be implemented with a double-sided adhesive tape ring. Stop plate 26 and adhesive member 28 each further define a primary aperture extending therethrough to accommodate pull rod 40, as also illustrated in FIG. 1.

Figure 2A:
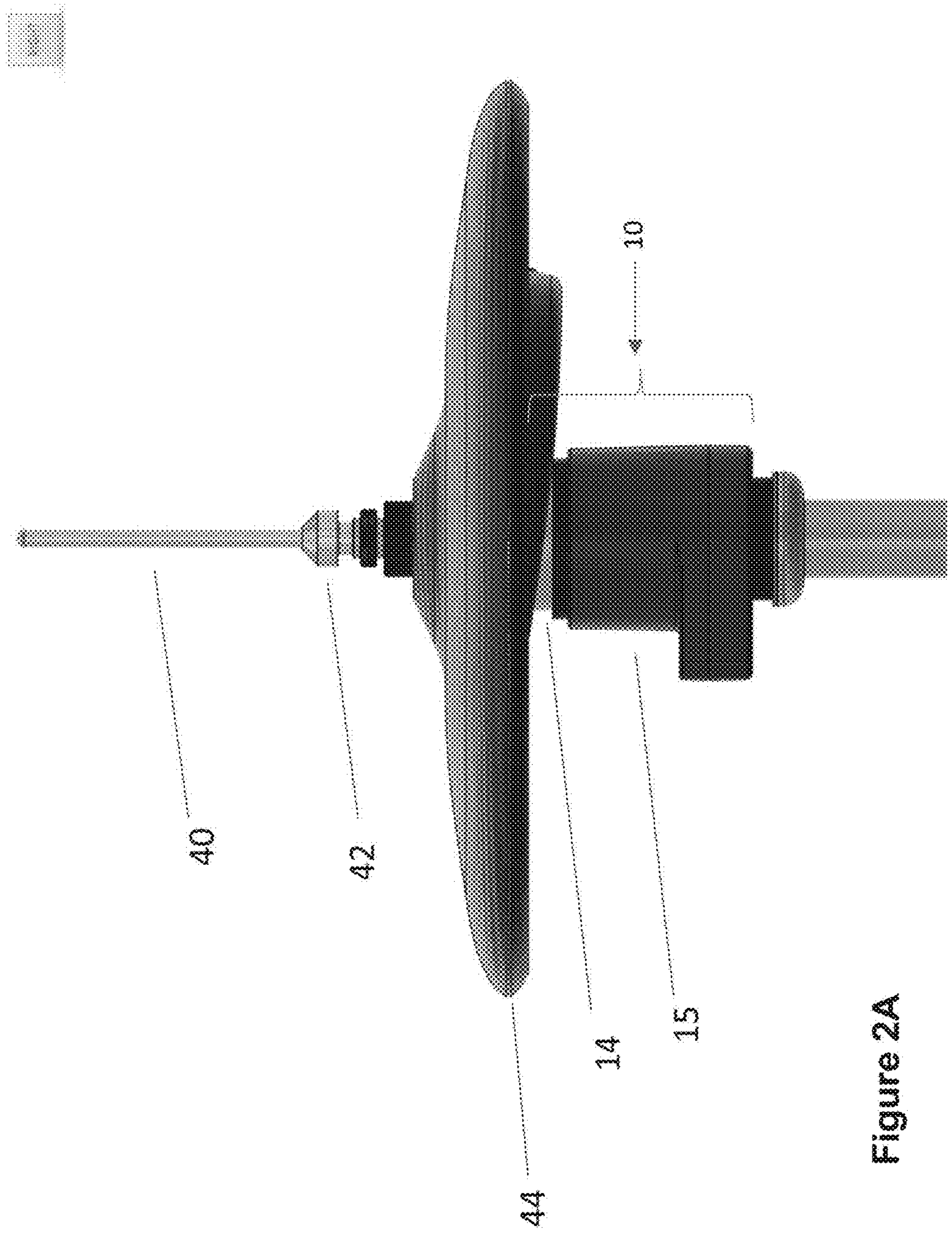
FIG. 2A illustrates conceptually a side plan view of an electronic hi-hat cymbal system with the Hall effect controller and clutch of FIG. 1 in a closed position in accordance with the disclosure.
Figure 2B:
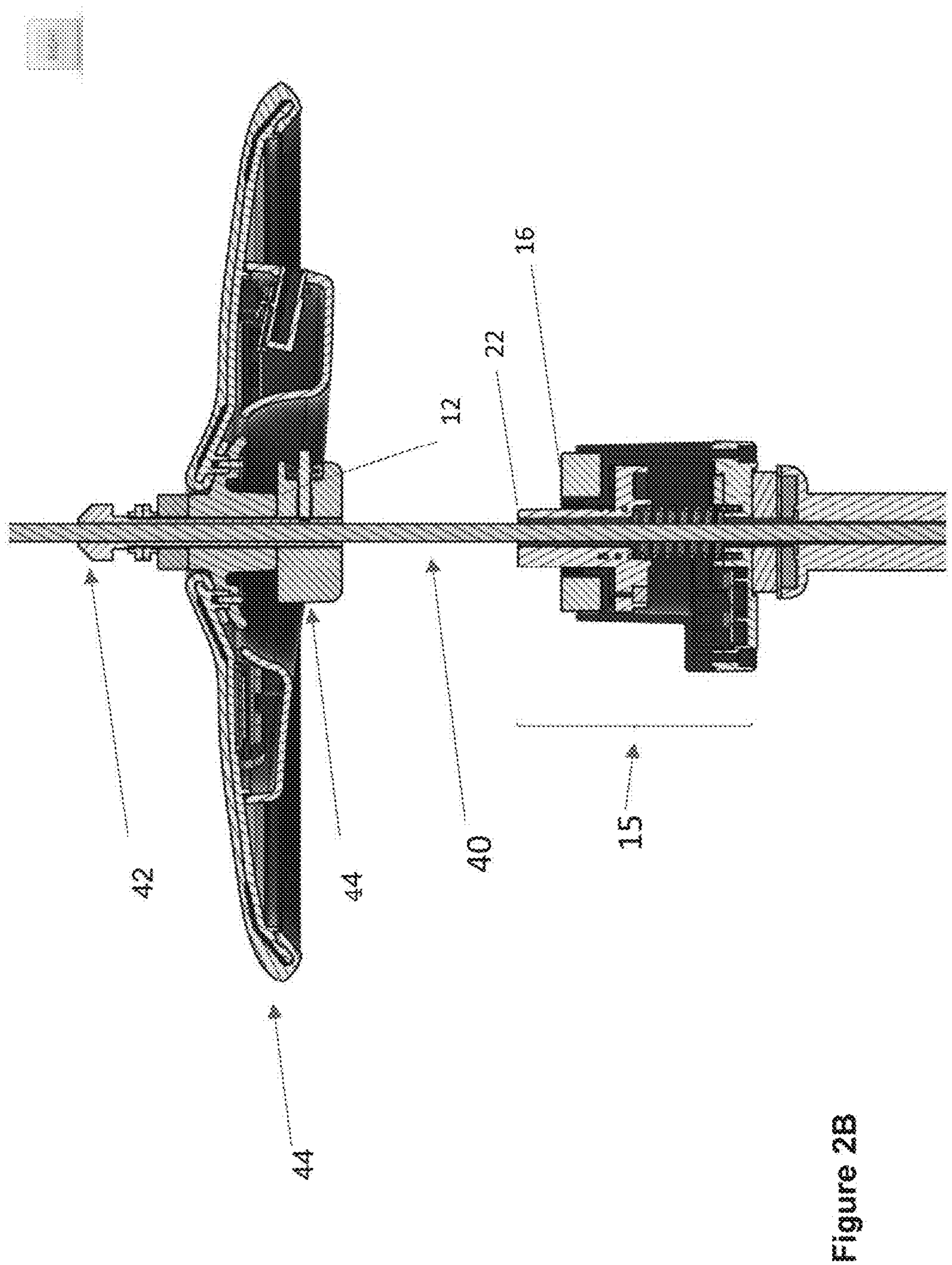
FIG. 2B is a side cross-sectional view of the electronic hi-hat cymbal system of FIG. 2A in an over-open position in accordance with the disclosure.
Figure 2C:
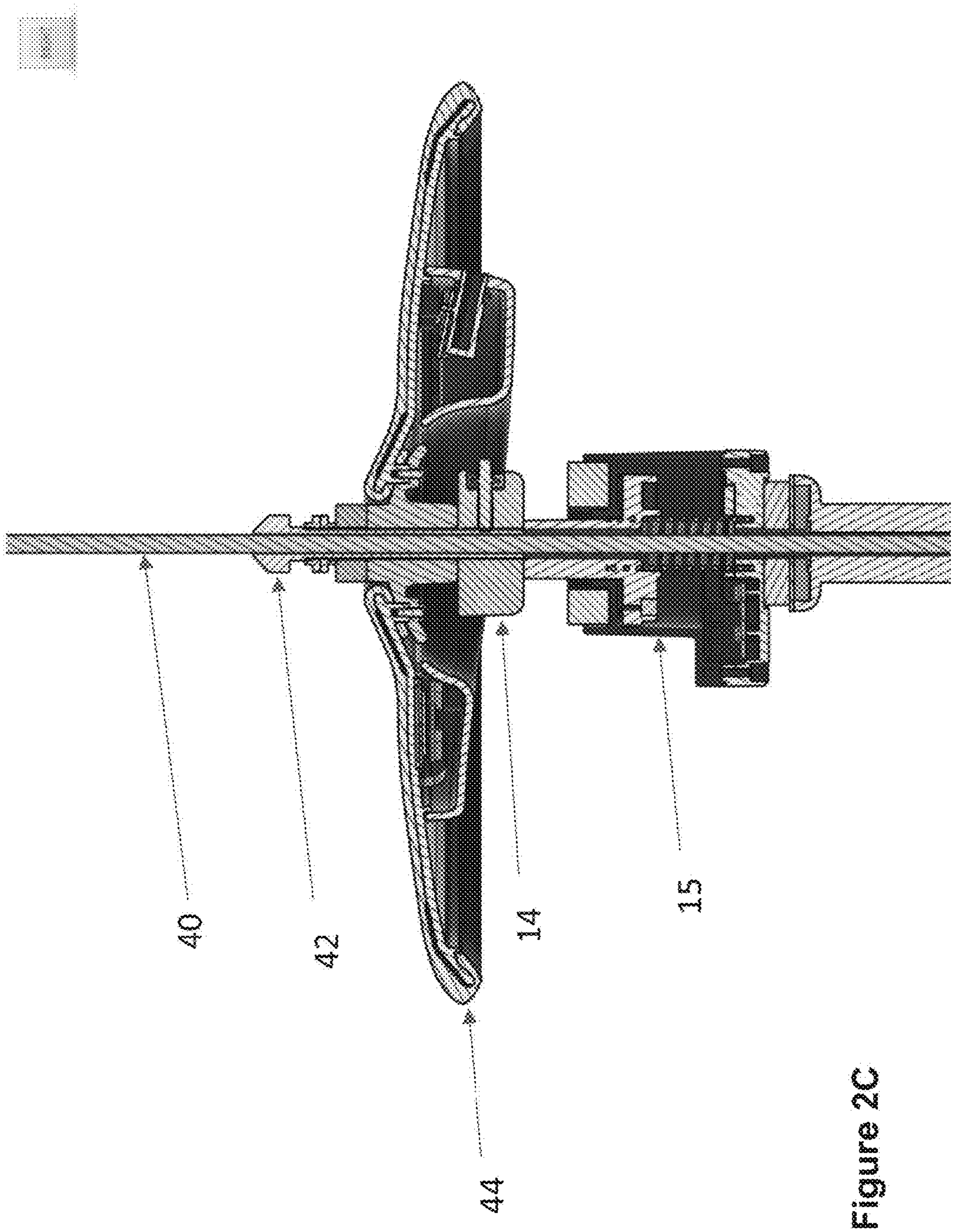
FIG. 2C is a side cross-sectional view of the electronic hi-hat cymbal system of FIG. 2A in an open position in accordance with the disclosure.
Figure 2D:
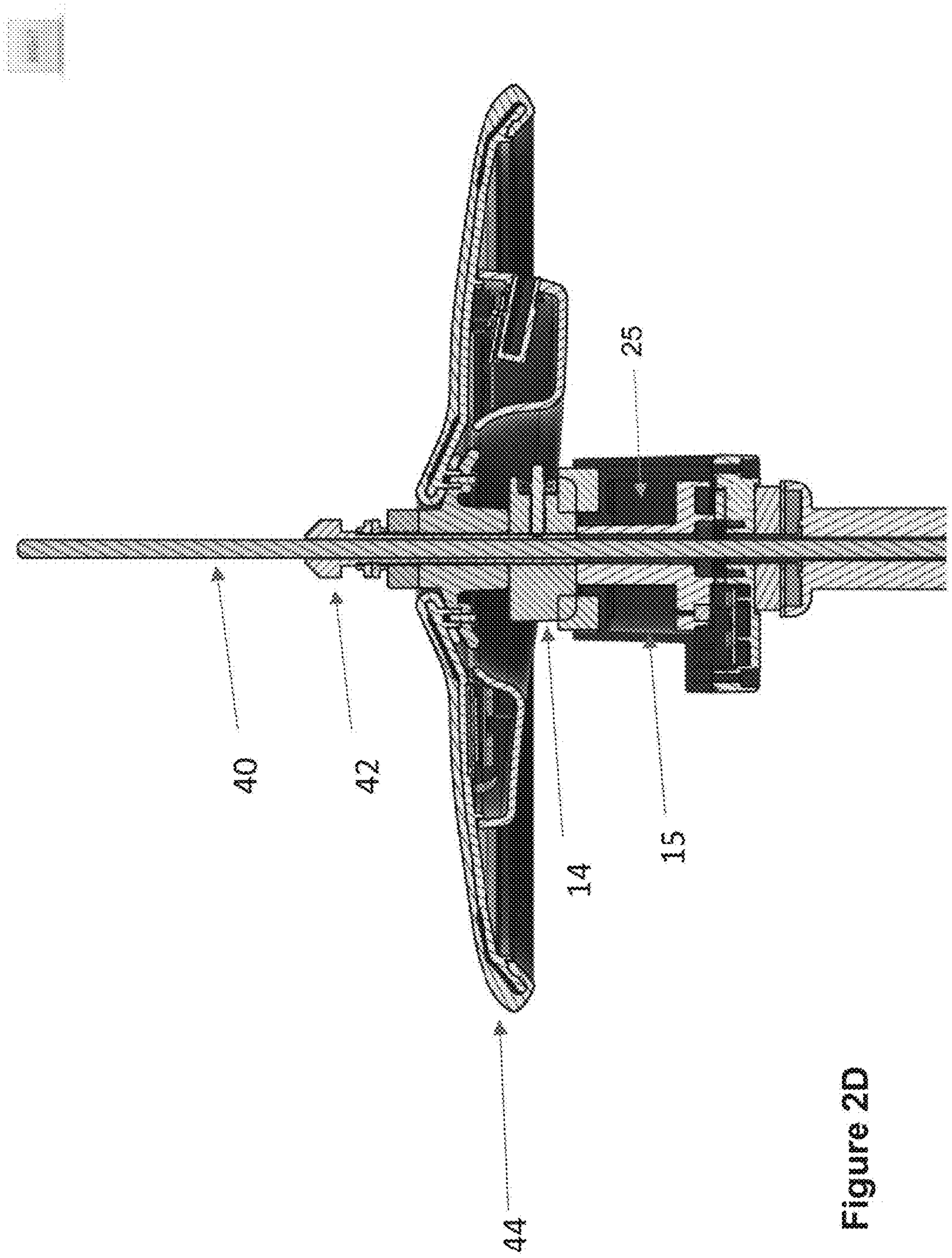
FIG. 2D is a side cross-sectional view of the electronic hi-hat cymbal system of FIG. 2A in a closed position in accordance with the disclosure.

A top surface of upper housing member 20 defines cylindrical channel to accommodate compression member 16 and further defines a primary aperture extending therethrough to accommodate pull rod 40 and a center cylindrical projection or neck of carriage 22, as also illustrated in FIG. 1. The compression member 16 may have a ring or toroid shape of substantial height, as illustrated. In embodiments, compression member 16 may be implemented with any natural or synthetic compressible materials including synthetic rubber, elastomers and/or plastics. In embodiments, compression member 16 may have a hardness rating of between approximately 40 to 60, as measured with the Shore A Durometer scale. Compression number 16 stops the downward movement of hi-hat cymbal 44, in a way that prevents mechanical noise, helps to recreate the travel/pressure of a traditional acoustic hi-hat cymbal, and provides the drummer with responsiveness that feels realistic. Compression member 16 is seated within the defined surface of upper housing member 20 and may be retained therein through either frictional engagement or with an adhesive member 18 which may be implemented with a double-sided adhesive tape ring. Compression member 16 and adhesive member 18 each further define a primary aperture extending therethrough to accommodate pull rod 40 and the center projection of carriage 22, as also illustrated in FIGS. 2B-D.

Compression carriage 22 comprises a base portion with a generally circular profile with features that mimic the interior surface of the inner cylindrical channel of upper housing member 20 and a cylindrical or extending approximately through the center thereof. A cylindrical projection or neck extends outward from approximately the center of the base portion of compression carriage 22 and defines an extension of the cylindrical bore to movably accommodate pull rod 40, as illustrated in FIGS. 2B-D and 3. A first indentation extends at least partially through the base portion of compression carriage 22 near a peripheral edge thereof and is sized and shaped to accommodate a permanent magnet 31 or other electromechanical field source on the underside of the base portion. The cylindrical bore on the underside of the base portion has an enlarged diameter to accommodate a spring 24, as illustrated. As pull rod 40 is pulled downward, cymbal 44 and clutch 14 are also pulled downward. The undersurface of clutch 14 makes contact with the end of the cylindrical neck of carriage 22 forcing the carriage 22 downward against spring 24 and moving magnet 31 closer to sensor 30. Compression member 16 and stop plate 26 partially absorb the downward momentum of clutch 14 and prevent the compression carriage 22 from traveling downward beyond the intended limited. Spring 24 may be implemented with a low resistance coil spring and is required only to return the compression carriage 22 back to its original position near the top of the interior cavity of upper housing 20 when the cymbal moves upwards.

Figure 4:
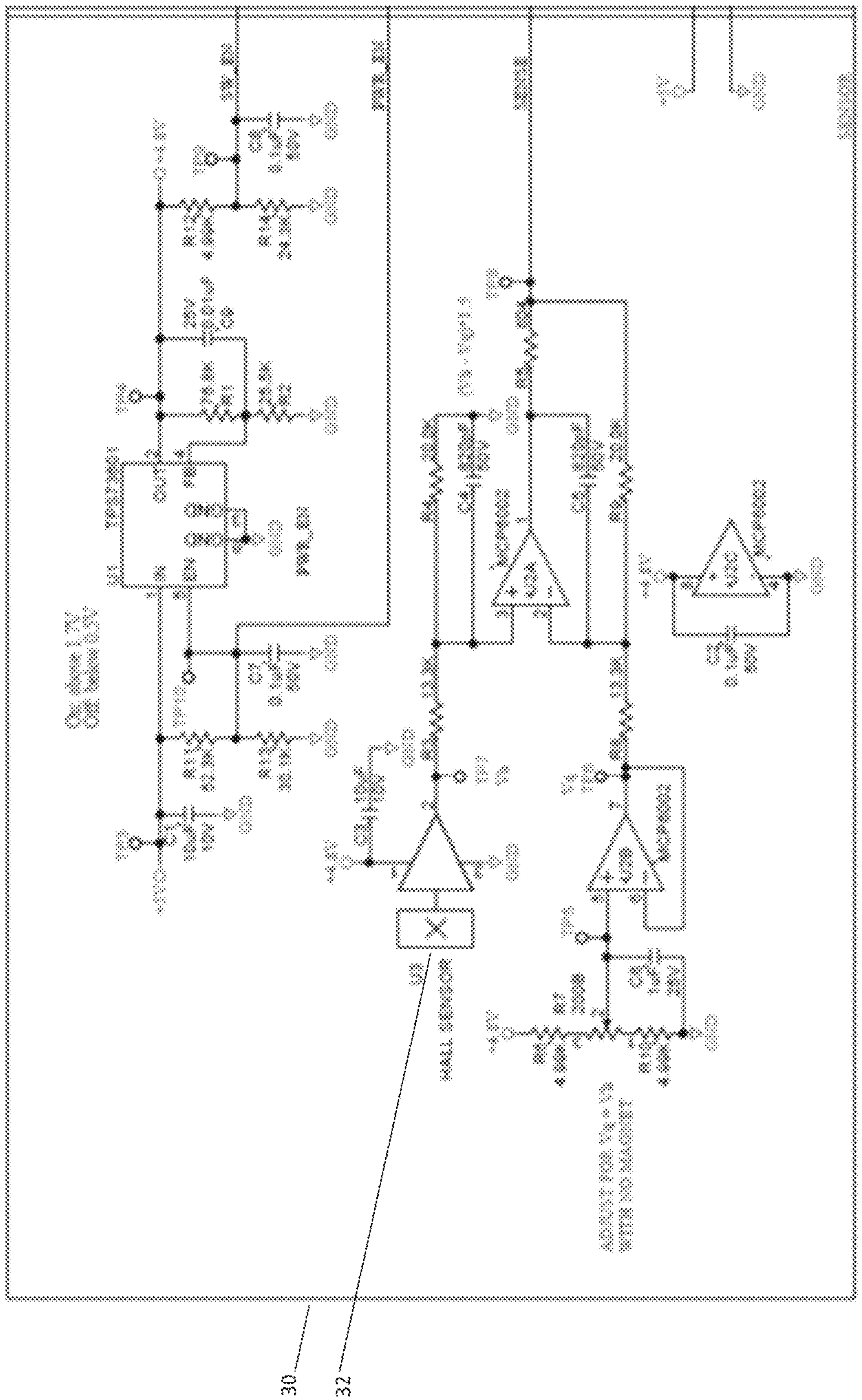
FIG. 4 is a schematic illustration of the sensor of the electronic hi-hat cymbal system of the electronic hi-hat cymbal system to take in accordance with the disclosure.

Sensor 30 comprising a printed circuit board having a Hall Effect sensor 32 with supporting power conditioning circuitry and signal condition electronics disposed thereon is secured to a flanged section of lower housing member 36 with screws 34. FIG. 4 illustrates schematically the sensor 30 comprising a Hall Effect sensor, power source, and calibration elements, as well as miscellaneous support circuit elements, as shown. Hall Effect sensor 32, may be implemented with any number of commercially available Hall Effect sensor which operate in response to on-axis sensor position sensing of a magnetic field source. One such Hall Effect sensor suitable for use with the disclosed system 10 is the Allegro AN27701 Hall Effect IC, a linear Hall Effect sensor, commercially available from Allegro MicroSystems, Inc., Manchester, New Hampshire. Power to sensor 30 may be supplied by drum module 65 or another device. Calibration elements remove quiescent offset and scale the signal for a 3.3V ADC. Table 1 illustrates a plurality of operational values for the distance, gauss, voltage delta, Hall Effect sensor output, and corresponding Analog-to-Digital (ADC) voltage parameters of a sensor 30.

TABLE 1

| distance | gauss delta | voltage | Hall output | ADC voltage |
|---|---|---|---|---|
| 10.175 | 411.2 | 1.97376 | 4.37376 | 2.96064 |
| 11.175 | 310.5 | 1.4904 | 3.8904 | 2.2356 |
| 12.175 | 237.7 | 1.14096 | 3.54096 | 1.71144 |
| 13.175 | 195.4 | 0.93792 | 3.33792 | 1.40688 |
| 14.175 | 162.8 | 0.78144 | 3.18144 | 1.17216 |
| 15.175 | 130.2 | 0.62496 | 3.02496 | 0.93744 |
| 16.175 | 103.1 | 0.49488 | 2.89488 | 0.74232 |
| 17.175 | 88.8 | 0.42624 | 2.82624 | 0.63936 |
| 18.175 | 74.5 | 0.3576 | 2.7576 | 0.5364 |
| 19.175 | 61 | 0.2928 | 2.6928 | 0.4392 |
| 20.175 | 53.8 | 0.25824 | 2.65824 | 0.38736 |
| 21.175 | 46.5 | 0.2232 | 2.6232 | 0.3348 |
| 22.175 | 39.3 | 0.18864 | 2.58864 | 0.28296 |
| 23.175 | 35 | 0.168 | 2.568 | 0.252 |
| 24.175 | 31 | 0.1488 | 2.5488 | 0.2232 |
| 25.175 | 26.9 | 0.12912 | 2.52912 | 0.19368 |
| 26.175 | 24.5 | 0.1176 | 2.5176 | 0.1764 |
| 27.175 | 22.5 | 0.108 | 2.508 | 0.162 |
| 28.175 | 20.4 | 0.09792 | 2.49792 | 0.14688 |
| 29.175 | 18.4 | 0.08832 | 2.48832 | 0.13248 |
| 30.175 | 16.4 | 0.07872 | 2.47872 | 0.11808 |

Figure 5:
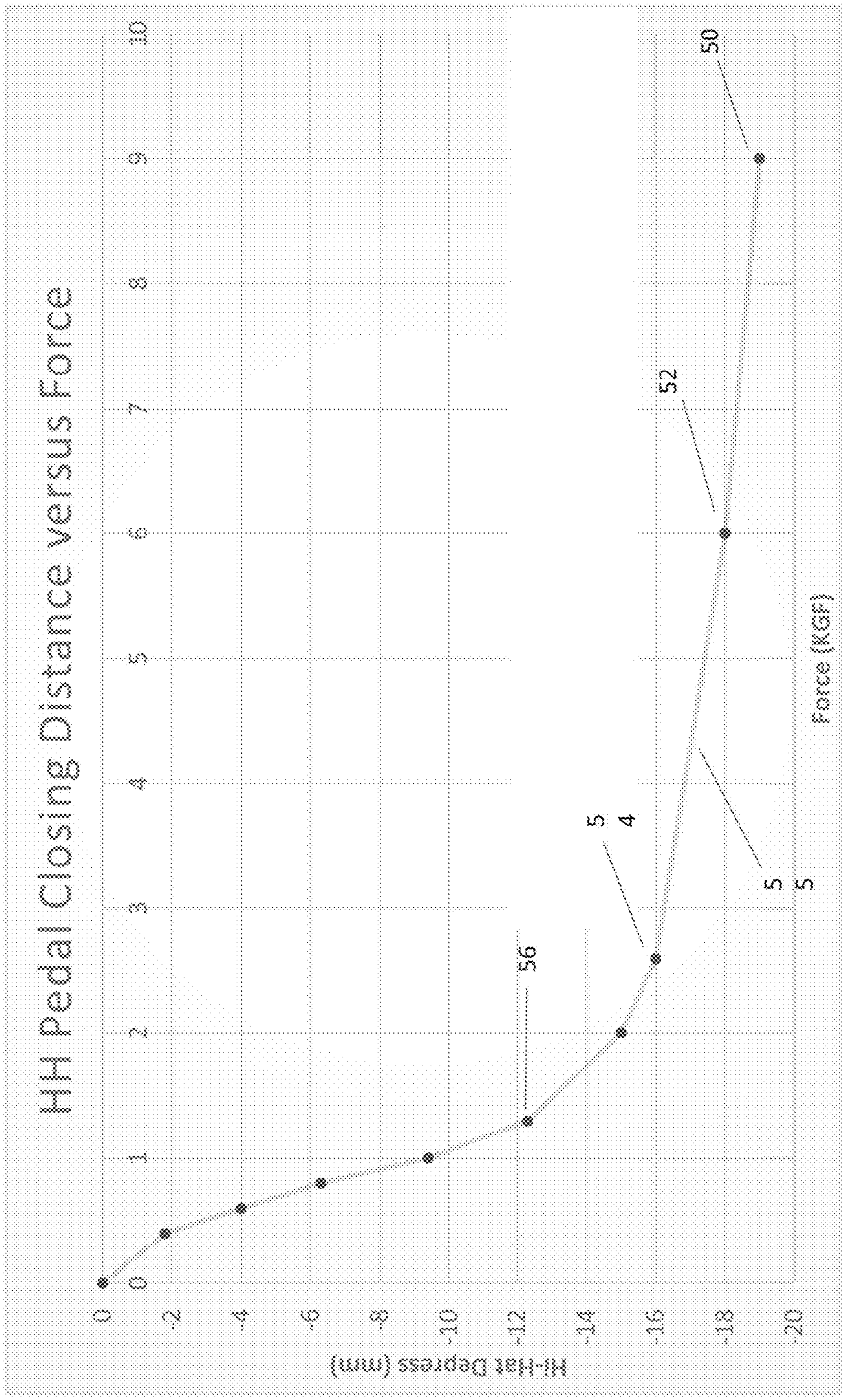
FIG. 5 illustrates conceptually the different hi hat zones as represented by a response graph of hi-hat travel distance (depression) versus pedal force of an electronic hi-hat cymbal system in accordance with the disclosure.

FIG. 5 is a graph 60 of hi-hat travel distance (depression) from its normal open resting position to tightly closed position versus pedal force, as represented by line 55 of graph 60. The actual measurements vary depending on pedal alignment and clutch attachments relative to the hi-hat pull rod. All points on line 55 in the approximately 0 to −12 mm range along the y-axis and in the approximately 0 to 1.3 KGF range along the x-axis, e.g. prior to point 56, represent generally the open range where electronic hi-hat cymbal 44 is not in contact with the cymbal clutch 14, as illustrated in FIG. 2B. In this range, the audio samples triggered by striking the cymbal 44 will be determined by the location struck on the cymbal and sensor placement therein, such sounds being generally longer audio events to mimic the characteristic acoustic ringing of a virtual top hi-hat cymbal prior to contacting the lower cymbal counterpart thereof.

The values at point 56 on line 55 represents approximately the point of contact between hi-hat cymbal 44 and cymbal clutch 14, as illustrated in FIG. 2C. At this point, drum module 65 triggers audio samples that emulate virtually the moment where the upper and lower cymbals of an acoustic hi-hat are first touching, with little pressure. This range may be adjustable via a calibration routine in the drum module 65.

The range of values along line 55 between point 56 and point 54 represent generally the distance that clutch 14 pushes the neck of compression carriage 22 downward through the interior cavity of upper housing 20 and against the compressive force of spring 24. Such movement carriers magnet 31 closer to the Hall Effect sensor 32 generating a range of signal values from controller 15 to drum module 65 which trigger audio samples that emulate the "semi-open" range of a virtual acoustic hi-hat when "sizzle" or "sloshy" sound normally occur. This is also the beginning of the range where the drum module 65 may start gradually muting any sustain cymbal sounds that will still ringing from prior hits. Point 54 represent the point at which a virtual hi-hat pair would be normally closed.

The range of values along line 55 between point 54 and point 52 represent generally significant downward pressure of clutch 14 onto compression ring 16 and compression carriage 22, as illustrated by FIG. 2D, generating a range of signal values from controller 15 to drum module 65 which trigger audio samples that emulate the fully "closed" and "tight" closed sounds of a virtual acoustic hi-hat. Acoustic hi-hats change tone depending on how much pressure is placed on them, even while they're already considered "closed". At this point, drum module 65 rapidly mutes any audio samples of open ringing cymbals that has been previously triggered.

The range of values along line 55 between point 52 and point 50 represent generally range that is not physically achievable by the user, but a safety buffer to prevent the user from continually slamming the compression disk down into the stop plate 26, or worse, driving the compression carriage 22 into the printed circuit board which contain sensor 30.

Figure 6:
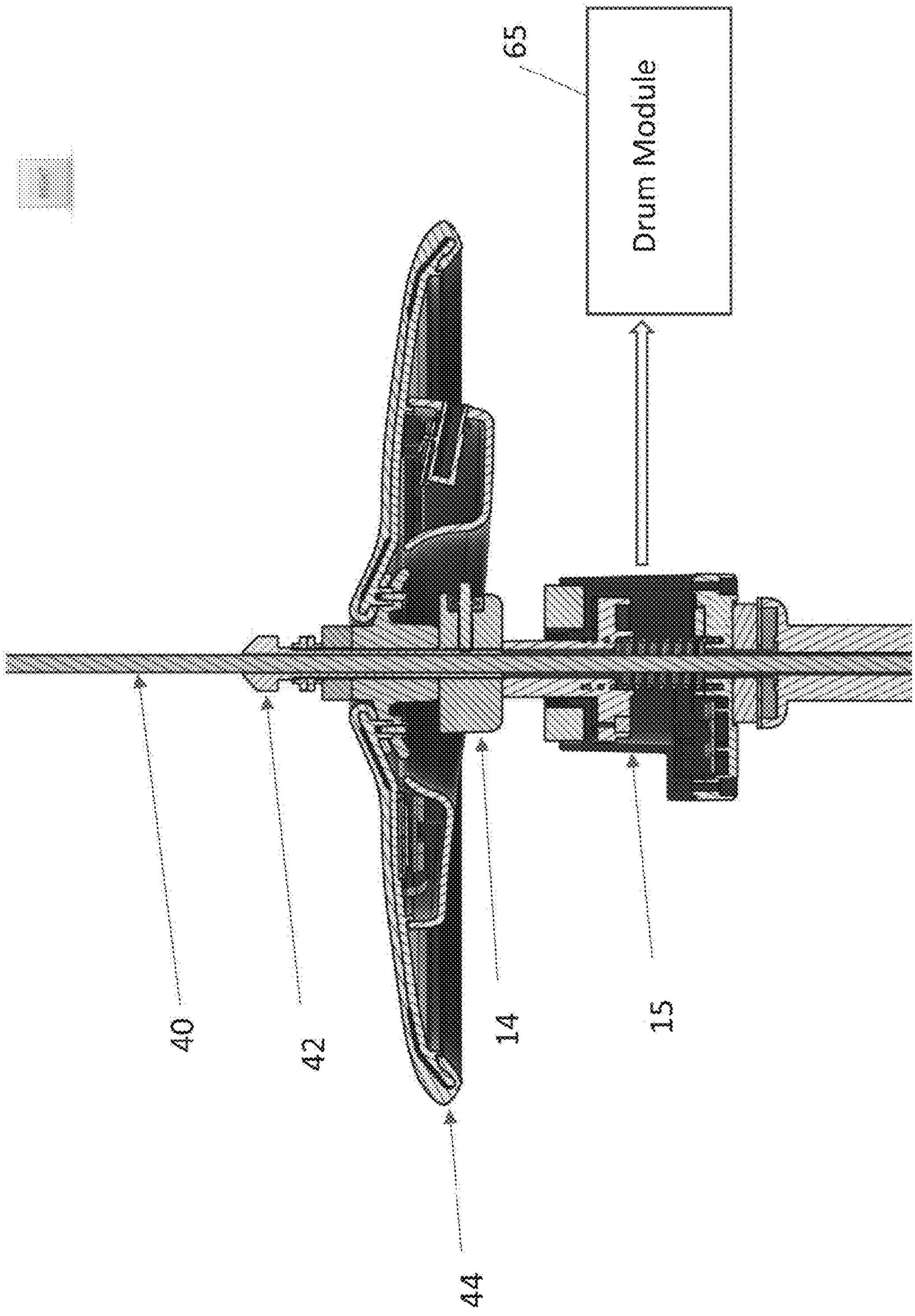
FIG. 6 is a side cross-sectional view of the electronic hi-hat cymbal system in accordance with the disclosure in combination with an audio sample playback triggering device.

FIG. 6 illustrates conceptually the interconnection between cymbal 44, controller 15 drum module 65. Power to sensor 30 and Hall Sensor 32 is provided by drum module 65, typically through a ¼" TRS cable or other suitable electrical connection. The drum module 65 detects whether a hall sensor hi-hat or a "traditional" passive hi-hat controller is connected. The voltage of the signal from controller component 15 is converted by drum module 65 in order to determine the following:

- The position of the virtual hi-hat, and thus which tight-closed/closed/semi-open(s)/open position hi-hat sounds play at any given moment that the cymbal is struck,
- If the pedal has been closed and at what velocity, so the proper "chick" sound can be played and any sustaining open cymbal sounds can be properly muted,
- If the "splash" technique has been performed (quickly stomping and releasing the pedal).

Various calibration features are available to the user for adjusting in which range the various hi-hat sounds occur. A user interface on drum module 65 may guide the user to find these positions intuitively, based on physically using the pedal and hearing sonic feedback. In embodiments, drum module 65 may be responsible to detect a wide variety of artifacts and "false" events. A number of these artifacts rely on the accurate detection of downwards velocity and acceleration in the controller position. For example:

- Was the downward motion of the controller caused by the user's foot pedal actuation, or was it caused (falsely) by the user hitting the cymbal downwards with their stick?
- When the user stomps the hi-hat system to a closed position, that impact sends energy up into the electronic cymbal trigger piezos.
- Is the user hovering on the border of two adjacent hi-hat states. e.g. between semi-open 1 & semi-open 2, in the event known as hysteresis.

In the disclosed embodiments, the hi-hat controller 15 generates a signal with significant resolution and linearity to help provide valuable and accurate data to the drum module 65, which manages or filter variables/chaos. The drum module 65 identifies and possibly rejects false electronic cymbal trigger events using one or more filter algorithms which interpolate the high resolution data from the controller 15. In the case of hysteresis, the drum module 65 identifies and may remove such rapid fluctuation between states, as it may cause artifacts in the samples that are being triggered.

The high resolution data from the controller 15, as provided to sound engine of the drum module 65, enables the drum module 65 to create seamless transitions between the changes in position coming from the controller 15. In particular, when the cymbal is on the way downward, the signal from controller 15 enables the sound engine of drum module 65 to realistically mute/decay the sustain of any previously triggered samples characteristic of an "open" position. Otherwise, the user will close the hi-hat but will still hear open ringing sounds. Drum modules suitable for use as drum module 65 with the electronic hi-hat cymbal system embodiments disclosed herein will provide power to the electronic cymbal, typically through the TRS cable.

There are several sounds a hi-hat can make purely by using foot technique, with no striking of a stick on the cymbal trigger. When the user stomps the cymbal down, it creates a "chick" sound. In order to play the correct "velocity" level of this chick sound, and in order to choose the correct sound that mimics the mute/decay behavior of a real hi-hat cymbal, the aforementioned downwards velocity/acceleration of the cymbal component consummated from the output signal of the Hall Effect sensor.

The disclosed hi-hat controller 15 simulates the "feel" of a real pair of hi-hat cymbals interacting and compressing to create the realistic physical feeling that drummers normally use with acoustic drum kits. Controller 15 can accommodate a wide range of variables, for example, drummers have a wide variety of hi-hat playing techniques, some of which can be quite violent. In addition, hi-hat stand manufacturers have a wide variety of designs, and manufacturing tolerances. Drummers are responsible to assemble their stand to a degree, and various missing pieces or mal-adjustment can make all of the above even less consistent.

Figure 7A:
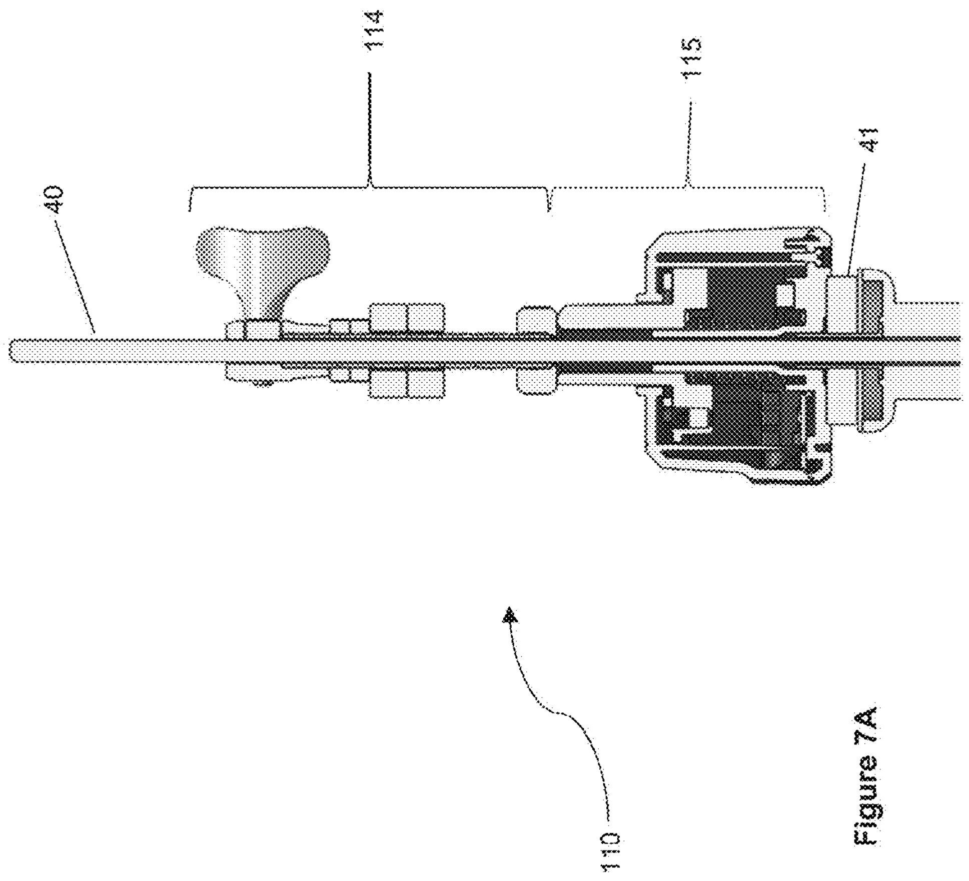
FIG. 7A illustrates conceptually a side cross-sectional view of an electronic hi-hat cymbal system with Hall Effect controller in an open position and disposed about a cymbal pull rod in accordance with the disclosure.
Figure 10A:
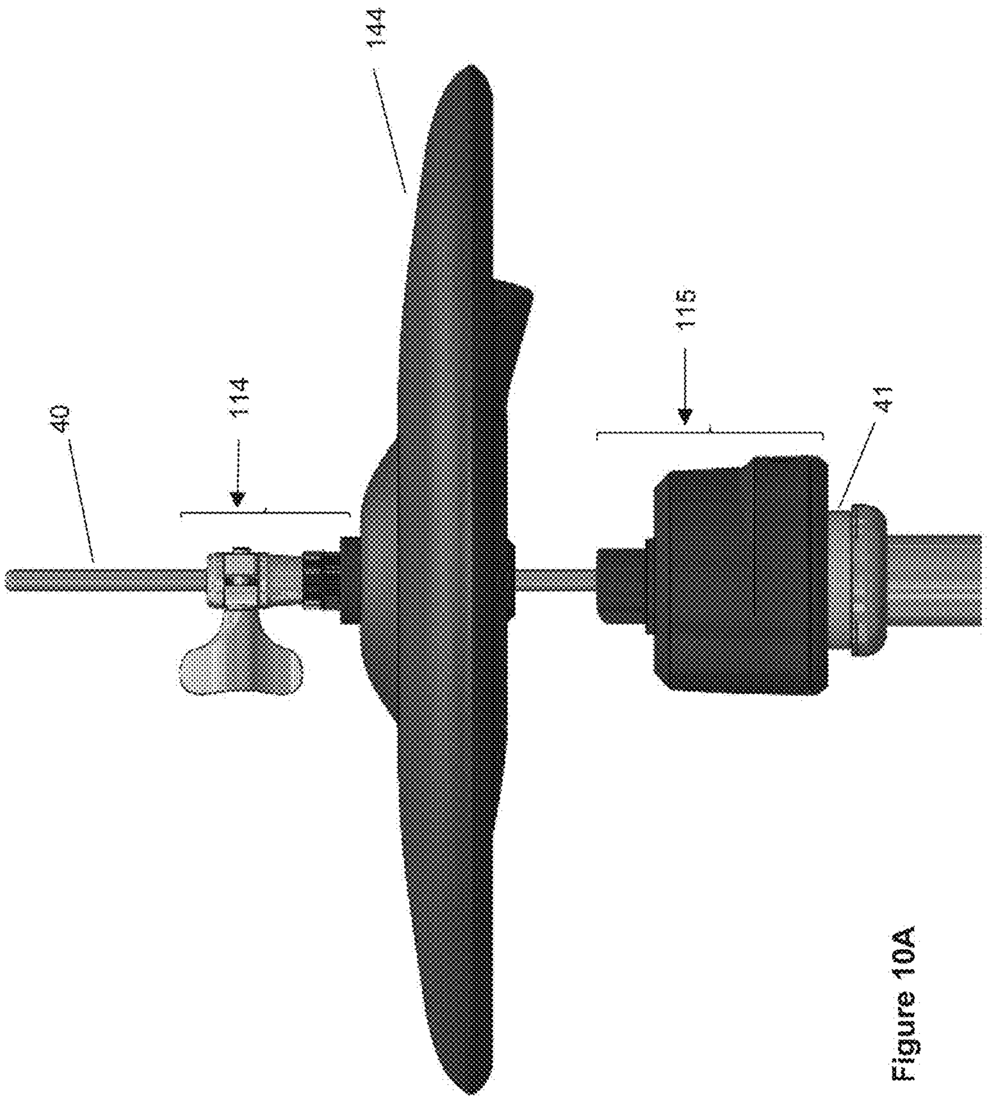
FIG. 10A illustrates conceptually a side plan view of the electronic hi-hat cymbal system of FIG. 7A in a closed position in conjunction with an electronic cymbal in accordance with the disclosure.
Figure 10B:
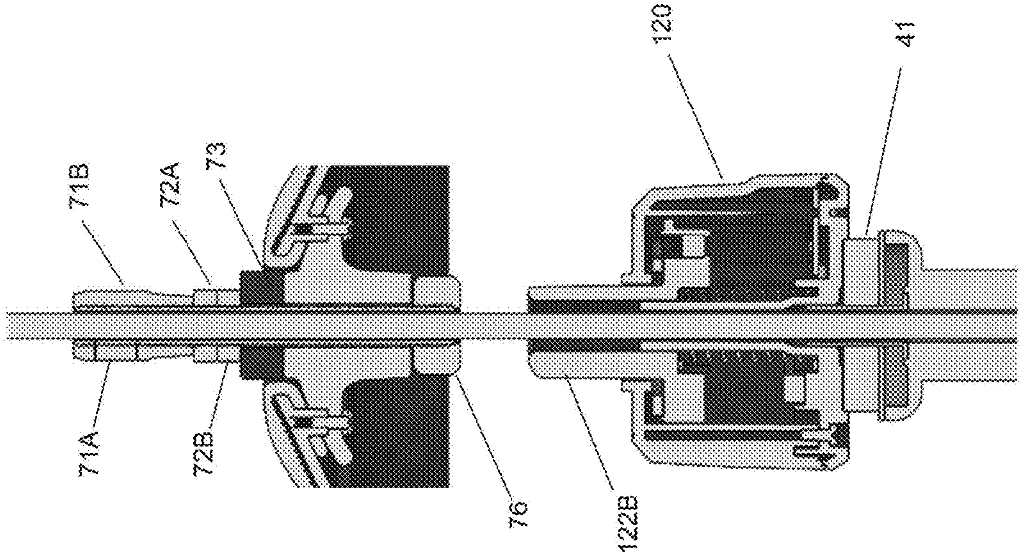
FIG. 10B is a side cross-sectional view of the electronic hi-hat cymbal system of FIG. 10A in an over-open position in accordance with the disclosure.
Figure 10C:
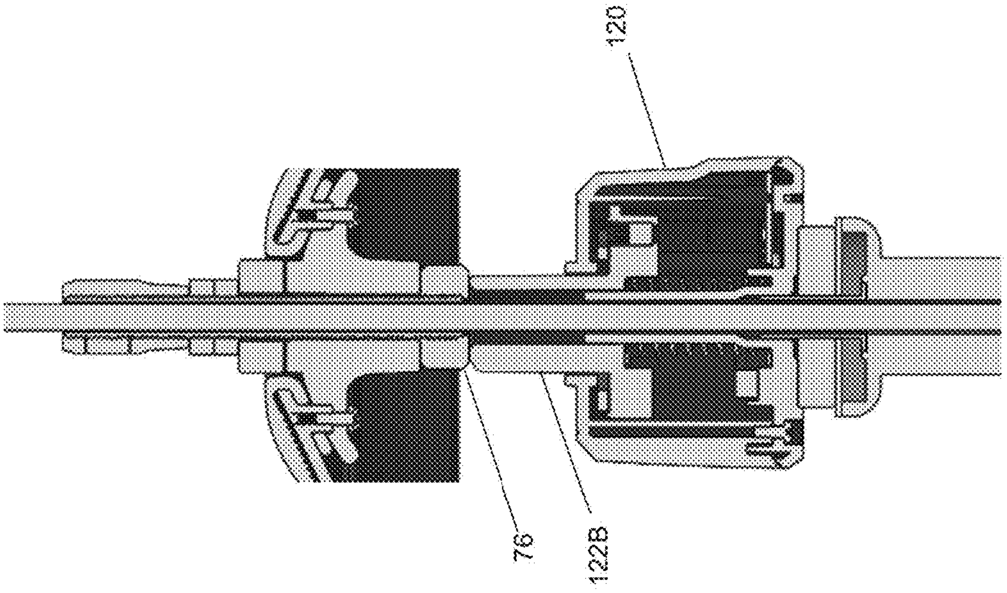
FIG. 10C is a side cross-sectional view of the electronic hi-hat cymbal system of FIG. 10A in an open position in accordance with the disclosure.
Figure 10D:
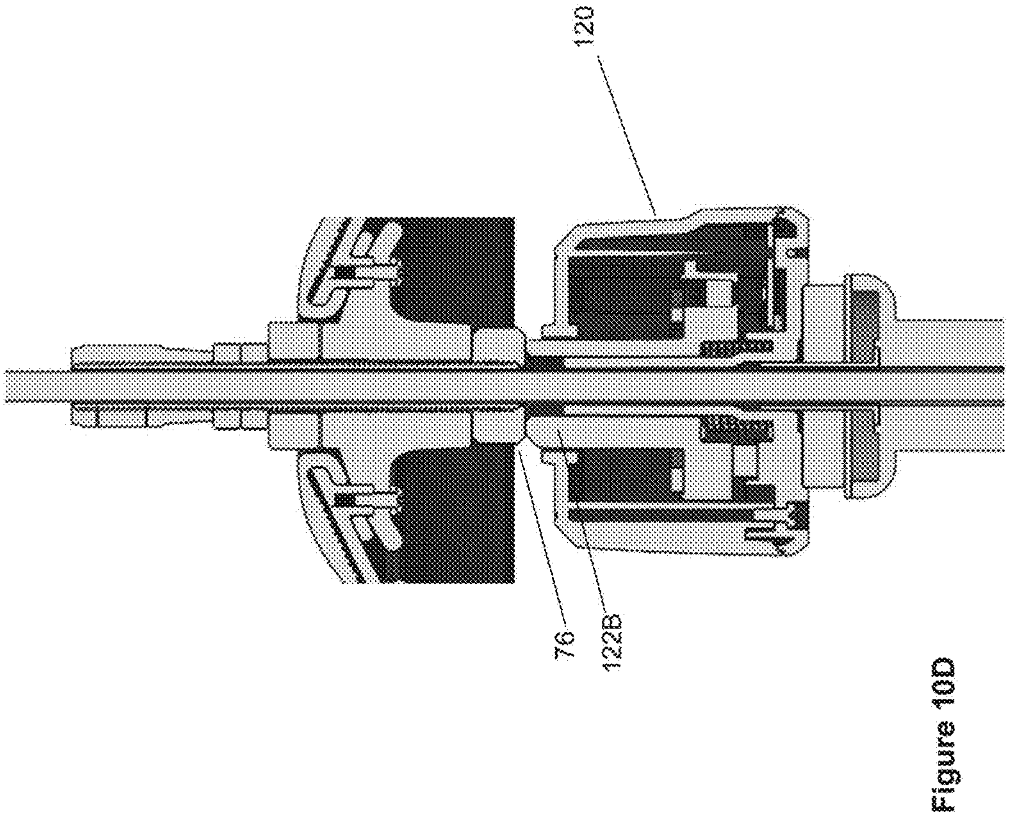
FIG. 10D is a side cross-sectional view of the electronic hi-hat cymbal system of FIG. 10A in a closed position in accordance with the disclosure.

FIG. 7A also illustrates embodiments of a hi-hat cymbal system 100 comprising a controller 115 and a clutch assembly 114. Clutch assembly 114 is securable to a pull rod 40 of a traditional hi-hat pedal stand (not shown). Controller 115 is disposed adjacent base tube 41 and/or pad of a traditional hi-hat tripod stand. FIG. 10A illustrates the hi-hat cymbal system 100 in use with an electronic hi-hat cymbal 144 which may be similar or different in function and structure to electronic hi-hat cymbal 44 describe herein. FIGS. 10B-D are side, cross-sectional views of the electronic hi-hat cymbal system 100 of FIG. 10A illustrating the electronic hi-hat cymbal and clutch 114 in closed, open and over-open positions, respectively, relative to the controller 115.

Figure 9:
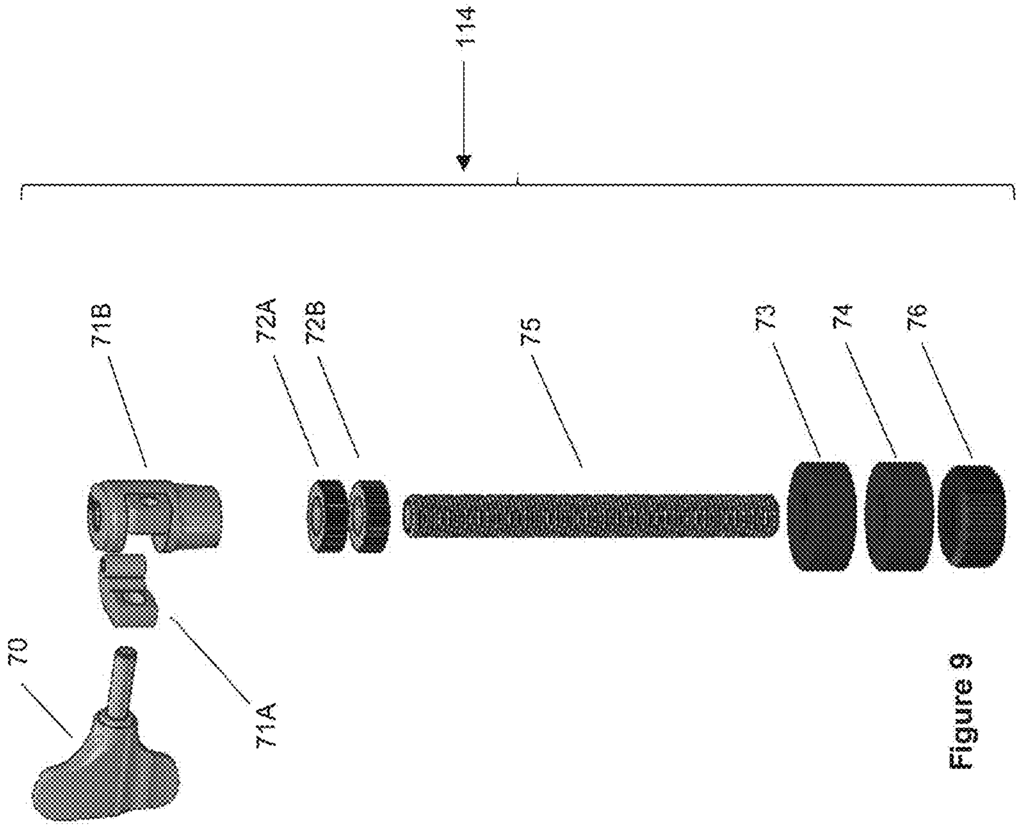
FIG. 9 is an exploded perspective view of the hi-hat clutch of FIG. 8 in accordance with the disclosure.
Figure 8:
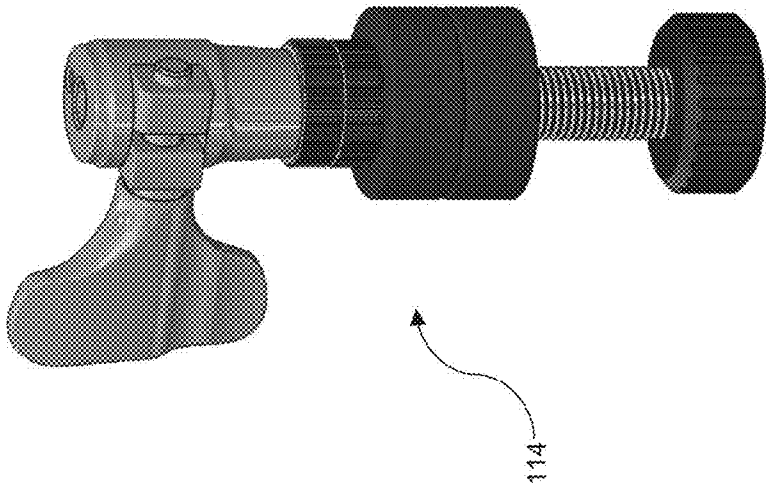
FIG. 8 is a perspective view of the hi-hat clutch of FIG. 7A in accordance with the disclosure.

Parts of the clutch assembly 114 are disposed both above and below the electronic cymbal 144 and secure the electronic cymbal 144 to the pull rod 40 of a traditional acoustic hi-hat pedal stand. As illustrated in FIGS. 8 and 9, clutch assembly 114 comprises winged bolt 70, collars 71A-B, spacers 72A-B, upper clutch rings 73-74, coil spring 75, and lower clutch ring 76. FIG. 9 is an exploded perspective view of the clutch assembly 114 of FIG. 8. As illustrated in FIG. 7A, coil spring 75 is disposed over and adjacent part of pull rod 40 and extends through apertures in each of spacers 72A-B, upper clutch rings 73-74, lower clutch ring 76, and partially into collars 71A-B. As illustrated in FIG. 10B, upper clutch rings 73-74 are disposed above cymbal 144 and lower clutch ring 76 is disposed below cymbal 144.

Winged bolt 70, collars 71A-B, spacers 72A-B, upper clutch rings 73-74, and lower clutch ring 76 keep coil spring 75 frictionally engaged against pull rod 40 and maintain the hi-hat electronic cymbal 144 in a fixed position relative to pull rod 40 as the pull rod 40 and cymbal 144 move up and down when the hi-hat pedal is depressed and released. Lower clutch 76 may be made from which a rigid materials such as a Acrylonitrile Butadiene Styrene (ABS) thermoplastic polymer. Winged bolt 70, collars 71A-B, and spring 75 may be made from metal such as aluminum or stainless steel. Spacers 72A-B, and upper clutch rings 73-74 may be made from any number of rigid or semirigid materials including polymers having various degrees of resilience.

Figure 7B:
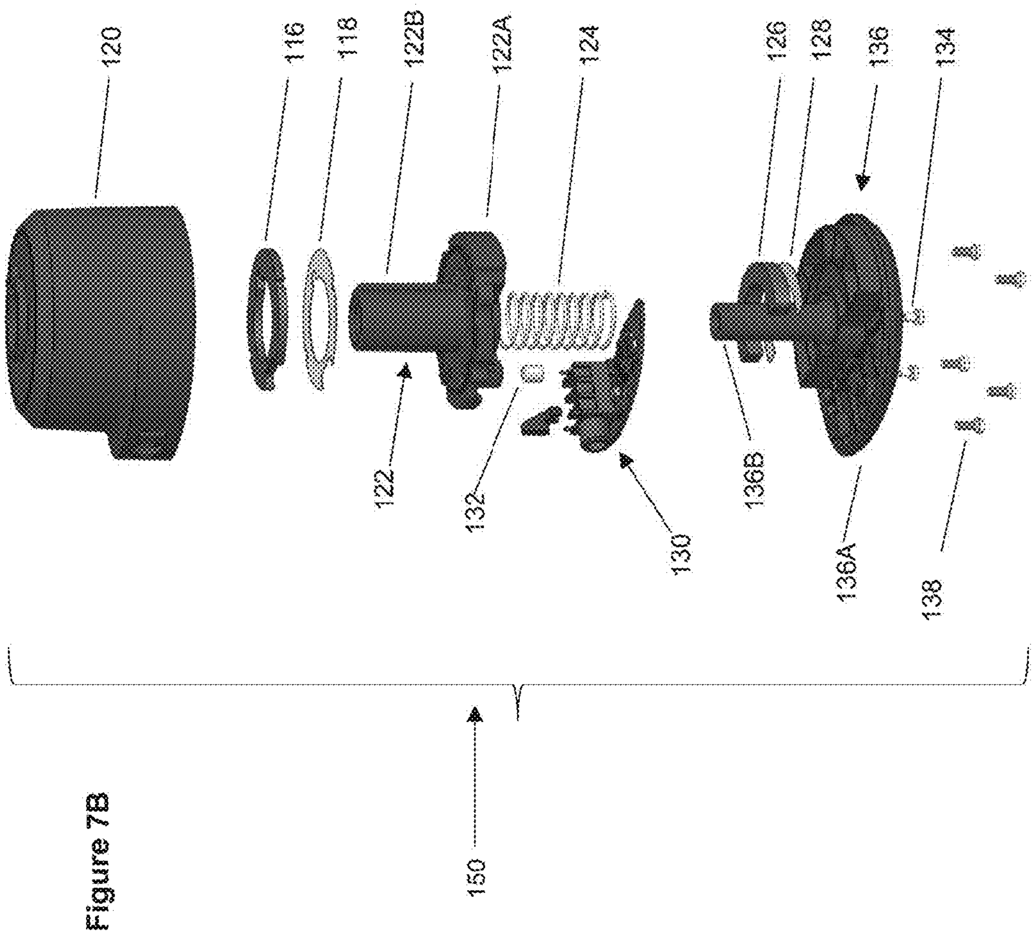
FIG. 7B is an exploded perspective view of a hi-hat symbol controller of FIG. 7A in accordance with another embodiment of the disclosure.

Controller 115 is disposed below the electronic cymbal 144 and about pull rod 40 which passes through the controller 115 without attachment thereto. Controller 115 measures the physical position of the electronic hi-hat cymbal 144 as it is pulled downward against the controller 115, in order to simulate the position of the virtual hi-hat and trigger the corresponding audio sample playback. FIG. 7B is an exploded perspective view of controller 115 assembly in accordance with disclosed embodiments. Controller 115 comprises an upper housing member 120 and lower housing member 136 joinable together with complementary mating features to provide enclosure for other elements within controller 115, as explained herein. In embodiments, such housing defines a generally cylindrical portion which collectively define an interior cavity 125 therein. The generally cylindrical portion accommodates movement of the decompression carriage 122 within interior cavity 125, as described in greater detail herein.

Upper housing member 120 and lower housing member 136 may be formed of the same or different material including, but not limited to a rigid materials such as ABS thermoplastic polymer. A bottom surface of lower housing member 136 may be substantially flat and may include a shallow cylindrical indentation to accommodate the features of the base tube/padding 41 of a traditional acoustic hi-hat cymbal stand. Lower housing member 136 may have at least a primary aperture extending therethrough to accommodate pull rod 40, as well as other full or partially extending apertures to receive screws 134 or 138 or other attachment mechanisms, as illustrated in FIG. 7B. The top surface of lower housing member 136A further defines a cylindrical projection or neck 136B with a cylindrical bore to movably accommodate pull rod 40 within the bore interior and further accommodate spring 75 about the exterior of neck 136B, as illustrated. The top surface of lower housing member 136A further defines shallow indentation at the base of the neck to accommodate stop plate 126 which may be implemented with any natural or synthetic compressible materials including synthetic rubber compression. The stop plate 126 is seated within the upper surface of lower housing member 136 and retained therein through either frictional engagement or with adhesive member 128 which may be implemented with a double-sided adhesive tape ring. Stop plate 126 and adhesive member 128 each further define a primary aperture extending therethrough to accommodate neck 136B, as illustrated in FIG. 7B. The lower housing member 136A, spring 124 and carriage 122 co-act to provide the movement necessary for sensor 130 to accurately emulate the motion of a virtual hi-hat cymbal.

Compression carriage 122 comprises a base portion 122A with a generally circular profile with features that mimic the interior cavity 125 of the upper housing member 120. A cylindrical projection or neck 122B extends outward from the upper surface of base portion 122A and defines a cylindrical bore to movably accommodate pull rod 40, as illustrated in FIGS. 10B-D. A first indentation extends at least partially through the base portion 122A near a peripheral edge and is sized and shape to accommodate a permanent magnet 131 on the underside of base portion 122A.

The cylindrical bore on the underside of the base portion 122A has a first elongate diameter portion to accommodate neck 136B and pull rod 40 when concentrically disposed within neck 136B. A second larger diameter cylindrical bore on the underside of the base portion 122A accommodates spring 124, as illustrated. As pull rod 40 is pulled downward, cymbal 144 and lower clutch ring 76 are also pulled downward. The under surface of lower clutch ring 76 makes contact with the end of neck 122B forcing the compression carriage 122 downward within cavity 125 and against spring 124 and moving magnet 131 closer to sensor 130. Spring 124 may be implemented with a low resistance coil spring and returns the compression carriage 122 back to its original position when the cymbal 144 and pull rod 40 move upwards. The upper surface of carriage 122 further defines a cylindrical channel to accommodate compression member 116.

Compression member 116 and stop plate 126 partially absorb the downward momentum of lower clutch ring 76 and prevent the compression carriage 122 from traveling downward beyond the intended limit. The compression member 116 may have a ring or toroid shape of substantial height, as illustrated. In embodiments, compression member 116 may be implemented with any natural or synthetic compressible materials including synthetic rubber, elastomers and/or plastics. In embodiments, compression member 116 may have a hardness rating of between approximately 40 to 60, as measured with the Shore A Durometer scale. Compression member 116 stops the downward movement of hi-hat cymbal 144, in a way that prevents mechanical noise, helps to recreate the travel/pressure of a traditional acoustic hi-hat cymbal, and provides the drummer with responsiveness that feels realistic. Compression member 116 is seated within base portion 122A of the upper carriage member and may be retained therein through either frictional engagement or with an adhesive member 118 which may be implemented with a double-sided adhesive tape ring. Compression member 116 and adhesive member 118 each further define a primary aperture extending therethrough to accommodate neck 122B of carriage 122, as also illustrated in FIGS. 10B-D.

A sensor 130 comprising a printed circuit board having a Hall Effect sensor 132 with supporting power and signal condition electronics is secured to the lower housing member 136A with screws 134 or other fastening devices. The sensor 130 comprises a Hall Effect sensor 132, power conditioning circuitry, and calibration circuitry as well as miscellaneous support circuit elements, similar to sensor 30, as shown schematically in FIG. 4. Hall Effect sensor 132, may be implemented with any number of commercially available Hall Effect sensors which operates in response to on-axis sensor position sensing of a magnetic field source. One such Hall Effect sensor suitable for use with the disclosed system 110 is the Allegro AN27701 Hall Effect IC, a linear Hall Effect sensor, commercially available from Allegro MicroSystems, Inc., Manchester, New Hampshire. Power to sensor 130 may be supplied by drum module 65 or another device. The power conditioning circuitry provides a regulated supply of current to operate Hall Effect sensor 132. Calibration circuitry remove quiescent offset and scale the signal for a 3.3V ADC.

Controller 115 may be connected to and interoperate with drum machine 65 in the same manner as previously described with reference to the interaction of controller 15 and drum machine 65, as described herein.

Figure 11:
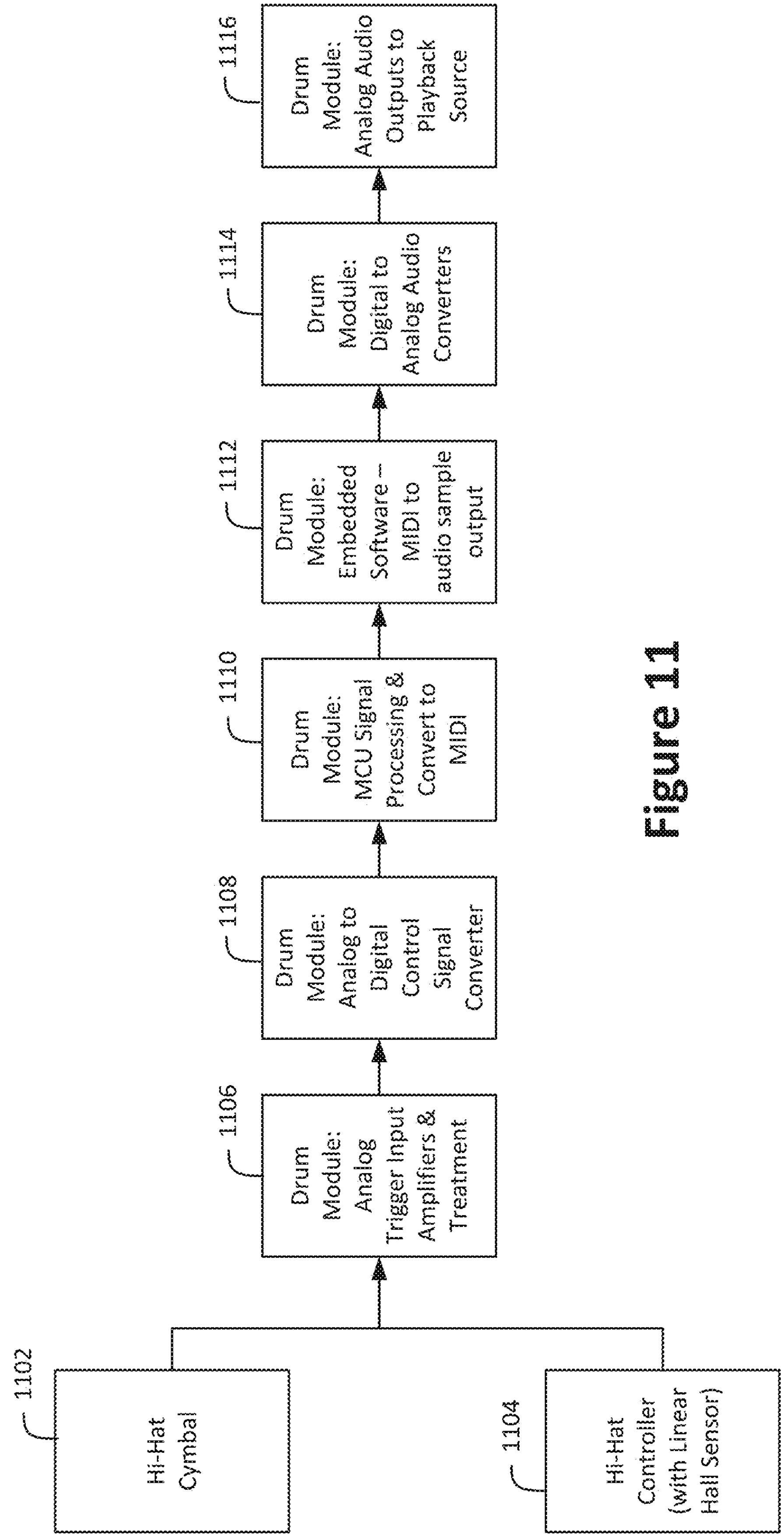
FIG. 11 illustrates a block diagram of a drum module that receives a signal from the disclosed cymbal component and processes the signal through various stages.

FIG. 11 illustrates a block diagram of a drum module that receives a signal from the disclosed cymbal component and processes the signal through various stages.

Stage 1102 indicates a hi-hat stand mounted cymbal trigger system. The single TRS cable connection from the cymbal provides two voltage signals:

One which captures how hard the drummer is hitting the cymbal (via sensors/transducers designed to capture signal strength)

One which captures a location on the cymbal where the drummer has hit the cymbal (via on/off, switch type sensors)

These two signals are sent discretely on one cable to stage 1106, which includes the trigger input connections of the drum module. Stage 1104 indicates a hi-hat stand mounted controller mechanism. The single TRS cable connection from the controller provides one voltage signal: A variable voltage which captures the height of the cymbal trigger relative to the controller, effectively tracking the hi-hat stand's pedal mechanism movement.

This single signal is sent discretely on one cable to stage 1106.

Stage 1106 represents the analog inputs of the drum module, which receive the voltages from stages 1102 and 1104. All signals are treated and prepared for stage 1108, which is the analog to digital converter of the drum module. Once the stage 1102/1104 signals are converted to raw digital streams, it is sent to a microcontroller (MCU). It should be noted that when the diagram shows two arrows between the modules, it indicates that the stages 1102 and 1104 signals are still discrete.

Stage 1110 is configured for a significant amount of processing and filtering of stage 1102/1104 signals, and eventually converts this into a single MIDI data stream.

The stage 1102 cymbal trigger signal is run through MCU firmware algorithms configured to measure the velocity (e.g., strength/level). The algorithms are further configured to measure the hit location via the switch sensors. The algorithms are further configured to comprehensively filter out noise that causes unwanted trigger events. For example, a trigger event may involve a drummer striking the cymbal once, but multiple strikes being falsely detected by the module. Another trigger event may involve a drummer striking one sensor location, but the wrong location being triggered. The algorithms are further configured to compare these two signals to create a single MIDI output signal comprised of: (a) a MIDI velocity value (e.g., how hard it was hit), a MIDI Note value (e.g., where it was hit), and a MIDI aftertouch value (e.g., if the cymbal was grabbed by the drummer, causing a "choke" or "mute" event—simulating a drummer grabbing a real cymbal to stop the resonance).

The strength of the hit/voltage is converted to a common MIDI velocity value between 0-127 (and optionally, a higher resolution 0-4096 value). When a strike event occurs, stage 1110 simultaneously looks for the switch/location sensor status. If no switch sensors are active, a MIDI note is sent indicating what is referred to as a cymbal "bow" zone event. If the sensor on the edges of the cymbal are detected, a MIDI note is sent indicating a cymbal "edge" zone event. If the cymbal "bell" sensor is hit, a MIDI note is sent indicating a cymbal "bell" zone event. Finally, if the user physically grabs the edge sensors for more than a threshold amount of time (e.g., X milliseconds defined by developer), this registers a "choke" event, which comes in the form of a MIDI aftertouch message. While this aftertouch event is active, the drum module's sound generator will typically play a muted or choked sound.

In some aspects, the cymbal trigger signal processing in the MCU is coupled with a hi-hat. For the hi-hat type system, there is an additional signal from the stage 1104 controller, which is processed and compared with the cymbal trigger signal to complete the performance capturing of the drummer's hi-hat. Like the stage 1102 signal, the stage 1104 signal is similarly treated by algorithms in the MCU firmware as follows:

Measure the voltage of the controller to indicate the height of the cymbal trigger on the hi-hat stand, and convert that to a variable MIDI CC value from 0-127 (also capable of 0-4,096 if needed)

Measure the upwards or downwards velocity and acceleration of the above controller position, which is then used to determine the strength of the pedal "chick" sound (simulating two cymbals of an acoustic hi-hat hitting together), and also used for several algorithms which filter out unwanted noise, for example, unwanted vibrations caused by the hi-hat stand hardware slamming against itself.

All of the information above may be used in multi-faceted, quite sensitive, and fine-tuned algorithms, which heavily rely on the accuracy of the incoming signal. This is where the excellent resolution, accuracy, and manufacturing repeatability of the hall sensor technology has incredible benefit. The physical/mechanical action and variance of a drummer's hi-hat can be so violent and diverse that an inaccurate or low resolution controller can render some unwanted noise impossible to decipher and control or isolate.

Similar to how the stage 1102 signals are combined to inform the creation of one set of MIDI events, in the next stage 1112, the sound generator portion of the software, is configured to take the filtered/finalized MIDI signals from stage 1110 and combine them to produce the desired sound/synthesizer output.

While a single virtual cymbal may have a series of sounds or "articulations" associated with it (e.g., bow, edge, bell), a hi-hat virtual cymbal must extrapolate those three articulations into several different hi-hat controller height/positions. For example, below is a list of available articulations in a typical high quality hi-hat sound source in the drum module used with the inventions disclosed. Keep in mind, these are all sounds carefully pre-recorded in a studio or similar by positioning an actual hi-hat cymbal set and stand in various degrees of "openness," under various striking techniques:

Bow Closed
Bow Semi-Open 1
Bow Semi-Open 2

Bow Semi-Open 3
Bow Fully Open
Edge Closed
Edge Semi-Open 1
Edge Semi-Open 2
Edge Semi-Open 3
Edge Fully Open
Edge Closed
Bell Semi-Open 1
Bell Semi-Open 2
Bell Semi-Open 3
Bell Fully Open
Pedal "Chick"
Pedal "Splash"

The above list of sounds is not indicative of any maximum; theoretically the number of different articulations is endless and only limited by the triggering system's ability to capture a performance accurately.

Essentially, the data coming from stages 1102 and 1104, which on stage 1112 have essentially been encoded into a single event described in MIDI data, are used to precisely choose which sound from the above articulation list is accurate. Then the stage 1112 software plays this sound to the stages 1114 and 1116 digital to analog audio converters and drum module audio outputs (a typical audio output implementation).

Further, the drum module's software at stage 1112 can also interpret the incoming MIDI data to apply certain DSP operations on the sounds being played back. For example, when a user hits a sound corresponding to an "open" hi-hat cymbal, and then afterwards they depress the hi-hat pedal and "close" the hi-hat cymbals, the software sound engine can simulate the effect of the cymbals muting each other as they come into contact with each other. Again, such synthesis methods can be well employed to create a realistic feeling and sounding electronic drum system, especially when the accuracy and resolution of the controller and cymbal input stages are so excellent.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

At various places in the present specification, values are disclosed in groups or in ranges. It is specifically intended that the description include each and every individual sub-combination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20. Real numbers are intended to be similarly inclusive, including values up to at least three decimal places.

As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents falling within the scope of the disclosure may be resorted to.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. An electronic hi-hat cymbal controller apparatus for use with a cymbal pull rod movable along an axis of motion and a cymbal clutch securable to the pull rod, the apparatus comprising:

A) a controller housing defining a central interior;

B) a carriage member movable mounted along an axis of motion within the central interior of the controller housing and defining an aperture for accommodating a pull rod, wherein the carriage member has an electromagnetic field source that is a permanent magnet disposed thereon;

C) a compressible member disposed within the controller housing proximate the carriage member;

D) a sensor that is a Hall Effect sensor disposed within the controller housing configured for generating a signal associated with an amount of compression of the compressible member.

2. The apparatus of claim 1, wherein the carriage member comprises a base member.

3. The apparatus of claim 2, wherein the base member has a cylindrically-shape neck extending outwardly therefrom with the aperture disposed at one end of the neck.

4. The apparatus of claim 2, wherein the compressible member comprises a partial or complete ring of resilient material.

5. The apparatus of claim 2, wherein the axis of motion of the carriage member within the central interior of the controller housing is parallel to the axis of motion of the pull rod.

6. The apparatus of claim 1, wherein the sensor is responsive to variations in the electromagnetic field caused by movement of the electromagnetic field source.

7. The apparatus of claim 6, wherein the variations in the electromagnetic field are caused by movement of the electromagnetic field source relative to the sensor.

8. The apparatus of claim 3, wherein the carriage member has a cylindrically-shape neck extending outwardly and defining a cylindrical bore for accommodating one of them pull rod or the base member neck.

9. The apparatus of claim 8, in combination with a clutch securable to the pull rod, a surface of the clutch strikable against the neck of the carriage member with movement of the pull rod.

10. The apparatus of claim 8, in combination with an electronic cymbal securable to the pull rod, a surface of the cymbal strikable against the neck of the carriage member with movement of the pull rod.

11. An electronic hi-hat cymbal controller apparatus for use with a cymbal pull rod and a cymbal clutch securable to the pull rod, the apparatus comprising:

A) a controller housing defining an aperture extending through the controller housing for accommodating a pull rod, B) an electromagnetic field source that is a permanent magnet disposed within the controller housing and movable along an axis of motion by contact with the cymbal clutch;

C) a sensor that is a Hall Effect sensor responsive to a position of the electromagnetic field source over a length portion of the axis of motion for generating a signal at least partially corresponding to the position of the electromagnetic field source.

12. The apparatus of claim 11, wherein the sensor is substantially uniformly responsive to positions of the electromagnetic field source over the length portion of the axis of motion.

13. The apparatus of claim 11, in combination with a device capable of playback of a plurality of audio samples in response to the signal.

14. The apparatus of claim 13, wherein a characteristic of the signal is used by the device to determine when to trigger playback of an audio sample.

15. The apparatus of claim 11, in combination with a clutch securable to the pull rod, a surface of the clutch strikable against a surface of the controller housing with movement of the pull rod.

16. The apparatus of claim 11, in combination with an electronic cymbal securable to the pull rod, a surface of the cymbal strikable against a neck of the controller housing with movement of the pull rod.

* * * * *